J. F. GREEN.
DRYING GRAIN BIN.
APPLICATION FILED SEPT. 28, 1916.
1,417,316.
Patented May 23, 1922.
2 SHEETS—SHEET 1.
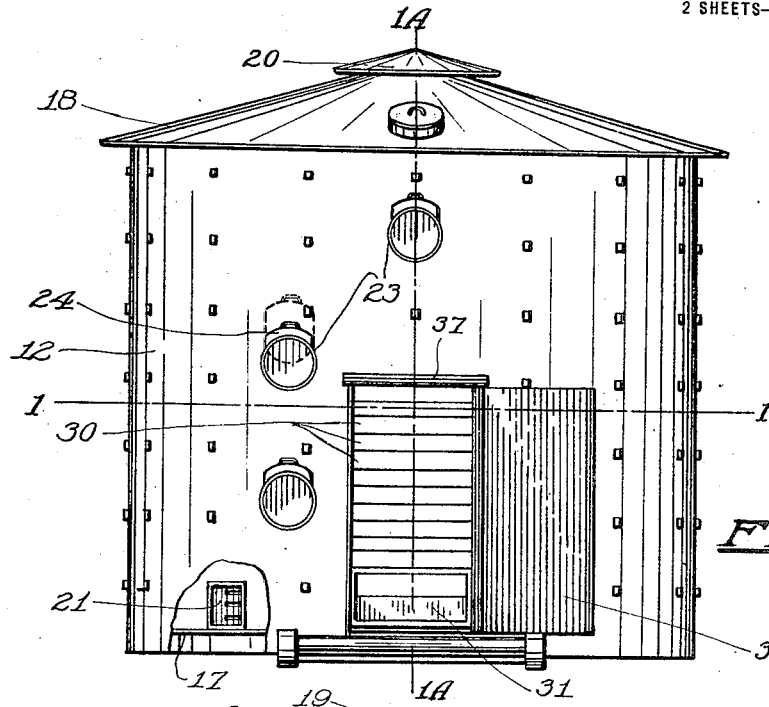
FIG. 1.
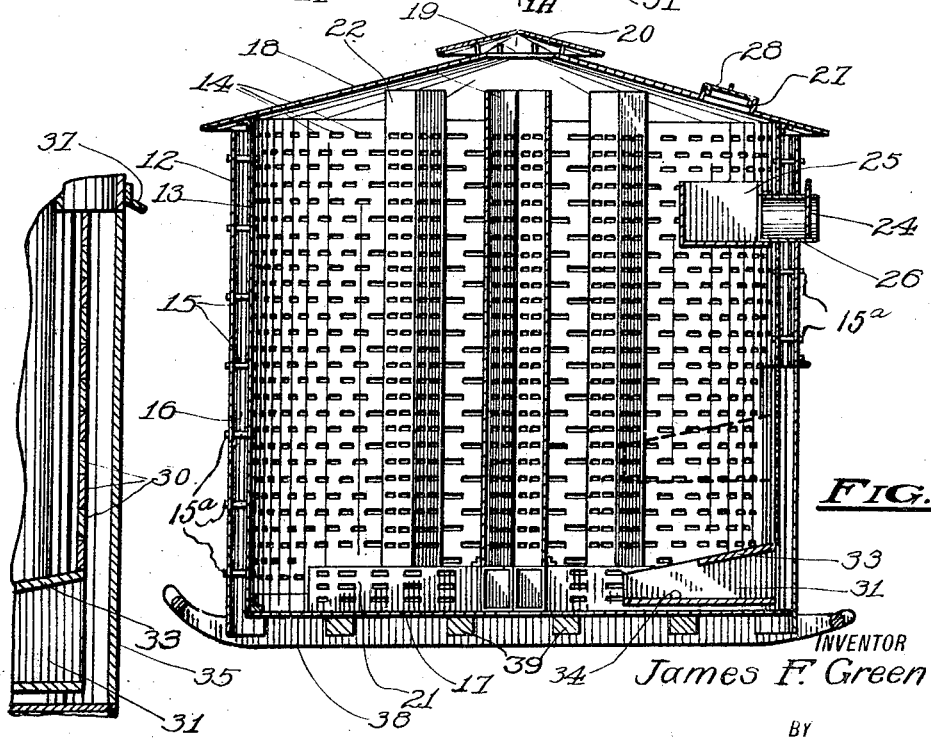
FIG. 2.
FIG. 9.
INVENTOR
James F. Green
BY
W. F. Davis & Son.
ATTORNEY

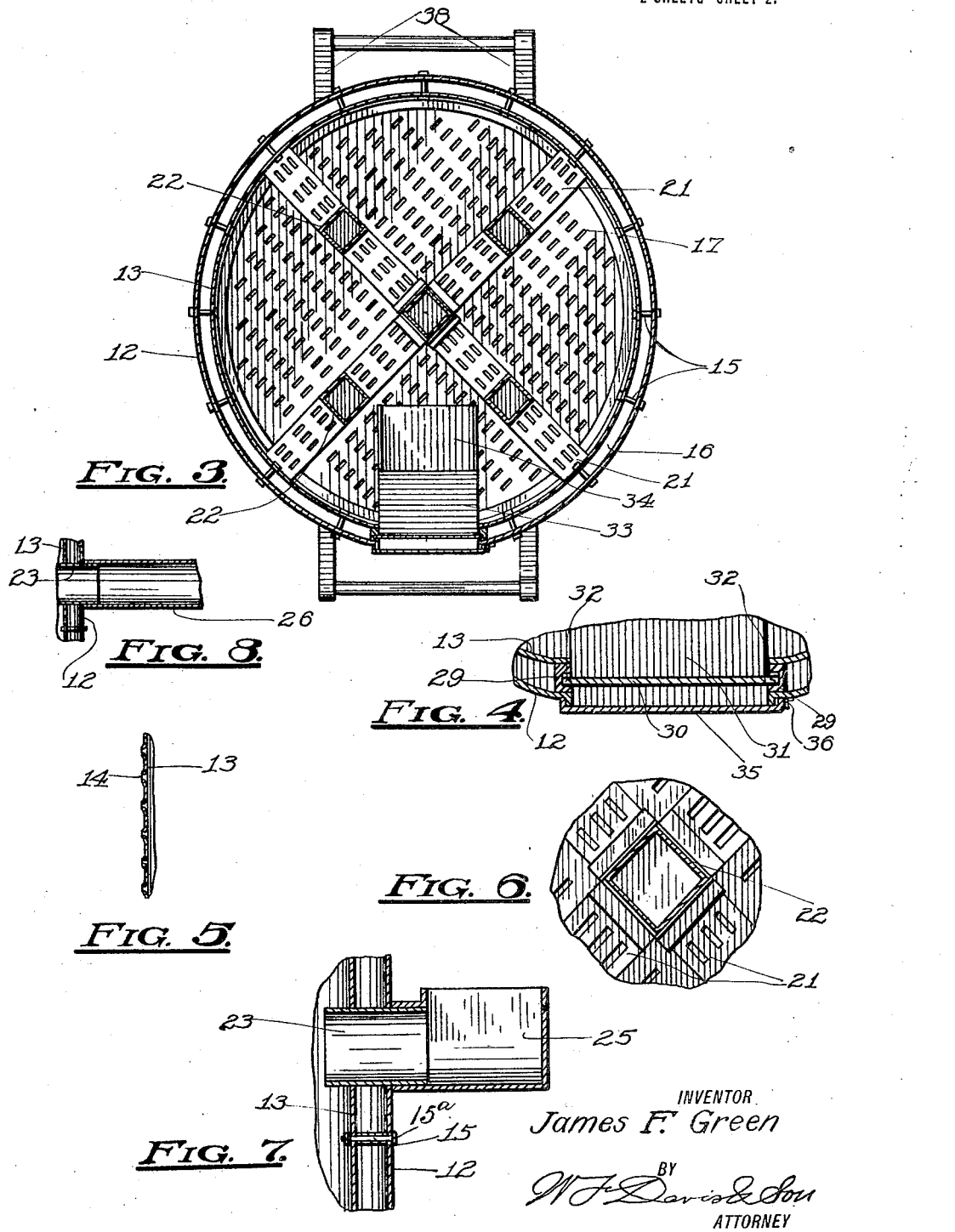

UNITED STATES PATENT OFFICE.

JAMES F. GREEN, OF JARBALO, KANSAS, ASSIGNOR OF ONE-HALF TO B. F. SAMUELS, OF LEAVENWORTH, KANSAS.

DRYING GRAIN BIN.

1,417,316.  Specification of Letters Patent.  Patented May 23, 1922.

Application filed September 28, 1916. Serial No. 122,638.

*To all whom it may concern:*

Be it known that I, JAMES F. GREEN, a citizen of the United States, residing at Jarbalo, in the county of Leavenworth and State of Kansas, have invented certain new and useful Improvements in Drying Grain Bins, of which the following is a full, clear, and exact description, such as will enable others skilled in the art to which it appertains to make and use the same.

The present invention relates to portable ventilated grain bins and more particularly to a system of ventilating grain bins.

Small grain as wheat and oats are usually threshed and stored in bins before going through the sweat as all such grain must within a certain commonly known period after being harvested. During the sweating of grain and at other common period a certain quantity of atmosphere is required to absorb and carry the moisture from the grain to prevent souring, must, mould and decay, the usual method being to remove the grain from one bin to another, or from one part of a bin to a different part of the same bin, this method requiring excessive bin room and considerable expense in rehandling the grain.

It is essential that a grain bin be provided in which grain newly harvested and threshed will be preserved in perfect condition without rehandling.

The present invention seeks to provide an improved grain bin from which all exterior moisture is excluded, together with suitable means to conduct all moisture evaporated from the grain during the curing or sweating process, to the exterior of the bin.

By excluding external moisture and conducting the moisture given off by the grain to the exterior of the bin, the grain is preserved in perfect condition.

A further object of the invention is to provide a bin in which moist or damp grain can be stored to dry the same.

A still further object of the invention is to provide an improved means of filling the bin.

A still further object is to provide improved means of removing the grain from the bin.

A still further object of the invention is to provide the bin with portable means so that it can be filled in the field and removed to any convenient place of storage.

With these and other objects in view the invention consists in the features of construction, combinations and arrangements of parts hereinafter set forth and more particularly pointed out in the appended claims, the accompanying drawings illustrating an application of the invention.

In the drawings:—

Fig. 1 is a view in elevation of the improved grain bin, with the external door open and the internal sectional door closed.

Fig. 2 is a sectional view in elevation of the improved bin, taken on line 1ᴬ—1ᴬ of Fig. 1.

Fig. 3 is a horizontal sectional view taken on line 1—1 of Fig. 1.

Fig. 4 is an enlarged fragmentary sectional view taken on line 1—1 of Fig. 1.

Fig. 5 is an enlarged fragmentary view of the inner wall showing the perforations therein.

Fig. 6 is an enlarged fragmentary sectional view taken on line 1—1 of Fig. 1.

Fig. 7 is an enlarged fragmentary sectional view taken on line 1ᴬ—1ᴬ of Fig. 1.

Fig. 8 is a fragmentary sectional view taken on line 1ᴬ—1ᴬ of Fig. 1.

Fig. 9 is an enlarged fragmentary view of Fig. 2.

The improved grain bin is preferably of cylindrical shape in order to secure cheapness of manufacture, the axis of the cylinder being preferably positioned approximately vertical, the outer shell 12 is non-perforated and weather proof, while the inner shell 13 is perforated by the holes 14 to allow air to enter and the evaporated moisture to escape.

The shells are separated as shown by the tubular shaped sleeves 15 and held in relative position by the bolts 15ᵃ, forming an air space 16 for the circulation of air to dry the grain, the outer shell being open from end to end so that the air will pass freely therethrough between the inner and outer shells.

The inner shell 13 is provided with the bottom 17, which is perforated as the shell 13 and the shells are covered with the pitched roof 18, the latter spaced above the outer shell 12 and extending sufficiently over the outer shell for weather protection, and provided with the ventilator 19, also protected by the weatherproof covering 20 so that air or evaporated moisture can escape from the inner shell and rain cannot enter.

Extending across the bottom 17 in approximately right angled relation are the rectangular pipes 21 forming air passages and communicating with the air passage 16 between the shells 12 and 13, the vertical pipes 22 connecting to the pipes 21 and communicating from the latter to above the inner shell 13 so that air can pass into the pipe 21 and up through the pipes 22 and out through the ventilator 19, also evaporated moisture from the grain can pass along the pipes 21 and out through the pipes 22, the pipes 21 and 22 being perforated as the shell 13 and bottom 17.

Secured in the shells 12 and 13 are the telescopic pipes 23, provided with the shut off gates 24 for the purpose of connecting by telescoping the shovel hopper 25, the latter being shown connected in Fig. 2, and for connecting also by telescopic connection the conducting pipe 26, the hopper being employed to receive grain shoveled or otherwise emptied therein from within the bin, and the conducting pipe being to direct the grain to a sack, box, wagon or other carrier outside the bin, it being understood that the hopper 25 and pipe 26 can be employed in connection with the pipe 23 which is in the most convenient location with reference to the quantity of grain in the bin. The hopper 25 can also be connected in like manner to the pipes 23 from the outer side of the bin and the conducting pipe 26 inside the bin, when desired for the purpose of filling the bin with grain.

Projecting from the roof 18 is the collar flange 27 to which is fitted weather-proof, the lid 28, this lid can be removed and the bin filled to a greater depth than can be from the pipes 23.

The inner door frames 29 are of channel shape and connect the shells 12 and 13, the inner door being formed of the separatable slats 30 so that it can be opened from the upper part downward by taking out one slat at a time as the grain is removed from the bin, and the door can be closed in reverse manner by building from the bottom upward, the shovel board 31 being provided with the flanges 32 which fit loosely in the channels the board being shown below all the slats, it is understood however that this shovel board can be regulated to any desired height with the channels or door frames by placing part or all of the slats below the shovel board, the latter being shown in dotted lines in elevated position in Fig. 2.

The shovel board is covered for a part of the distance of its length by the cover 33 so that grain will flow to the bottom 34 thereof as shoveled therefrom, and will not flow from the bin.

The outer door 35 is hinged at 36 and closes the bin weather proof, the weather strip 37 above the door shedding water therefrom.

The grain bin is mounted on the runner shaped sills 38 and the stringers 39, the stringers positioned transversely of the sills and embedded therein and forming a rest for the bottom 17 and the shells 12 and 13.

The inner shell 13 does not extend below the bottom 17; while the outer shell 12 extends below the bottom 17 and around the stringers 39, and around the sills 38 but not to the bottom thereof.

The outer shell 12 extends below the inner shell 13 so that rain will not be blown against the bottom 17, and the sills 38 extend below the outer shell 12 to form an air space between the shell and the ground on which the sills 38 may rest so that air may circulate underneath the outer shell 12 and upwardly between the shells 12 and 13, it being obvious that the air will pass outwardly over the shell 12 and underneath the roof 18.

The sills 38 are runner shaped as shown so that when the bin is filled in the field, it may be drawn to some suitable place of storage, as a barn yard or the like.

The improved grain bin forms a safe storage room for all kinds of grain and more especially for new grain that has not been through the sweat, and for damp grain, it being understood that damp grain will soon become dry by reason of the free circulation of air through and around the grain, and the drying process will prevent souring, mould and decay, which ruins the grain and renders it worthless.

What I claim as new, and desire to secure by Letters Patent, is:—

1. In a drying grain bin, a vertically disposed perforated cylindrical shell, a non-perforated vertically disposed cylindrical shell encircling said perforated shell and spaced therefrom forming an air passage, tubular shaped sleeves in said air passage between said shells and holding them equally spaced, bolts passing through said shells and said sleeves and binding said shells together and to said sleeves, said perforated shell covered by a roof, a weather proof exit hole in said roof, said roof projecting over said non-perforated shell and forming a weather proofing, said non-perforated shell spaced below said roof and forming an air passage communicating with the air passage formed between said shells, a perforated bottom in said perforated shell, and said non-perforated shell extending below said bottom and forming a weather-proofing around said perforated shell so that air may pass upward or downward through the passage between said shells and rain cannot enter said passage.

2. In a portable grain drying bin, a pair of runner shaped sills, stringers crossing said sills at right angles, a flat bottom resting on said stringers and sills, a cylindrical perforated shell rising from said bottom, an outer cylindrical shell encircling said perforated shell and spaced therefrom, sleeves between said shells, bolts passing through said sleeves and said shells and securing said shells rigidly together, the bottom of said outer shell spaced above the bottom of said sills and below the bottom of said perforated shell and forming a weatherproof exterior opening to the space between said shells, a roof resting on said perforated shell and extending over said outer shell, said outer shell spaced below said roof and forming a weatherproof exterior opening to the space between said shells, and a weatherproof opening in said roof.

3. In a drying grain bin, a portable base, a flat bottom resting on said base, a cylindrical shaped perforated shell rising from said bottom, a roof resting on said shell and extending outwardly therefrom, a weather proof opening in said roof, upper and side walls crossing said shell and resting on said bottom and forming laterally disposed rectangular shaped pipes along said bottom, the said bottom forming the bottom wall of said pipes, said pipes opening outwardly through said shell, the side and upper walls of said rectangular pipes perforated, perforated pipes rising from said rectangular shaped pipes and extending above said cylindrical shaped perforated shell and presenting open ends underneath and adjacent said roof, an outer shell encircling said perforated shell and extending upward to near said roof and forming an opening between said roof and the upper end of said shell, and said outer shell extending downwardly below said bottom and forming an opening at the bottom thereof and weatherproofing said rectangular pipes so that air can enter said pipes from the bottom or top of said outer shell and rain cannot enter said pipes.

JAMES F. GREEN.